Figure 1:
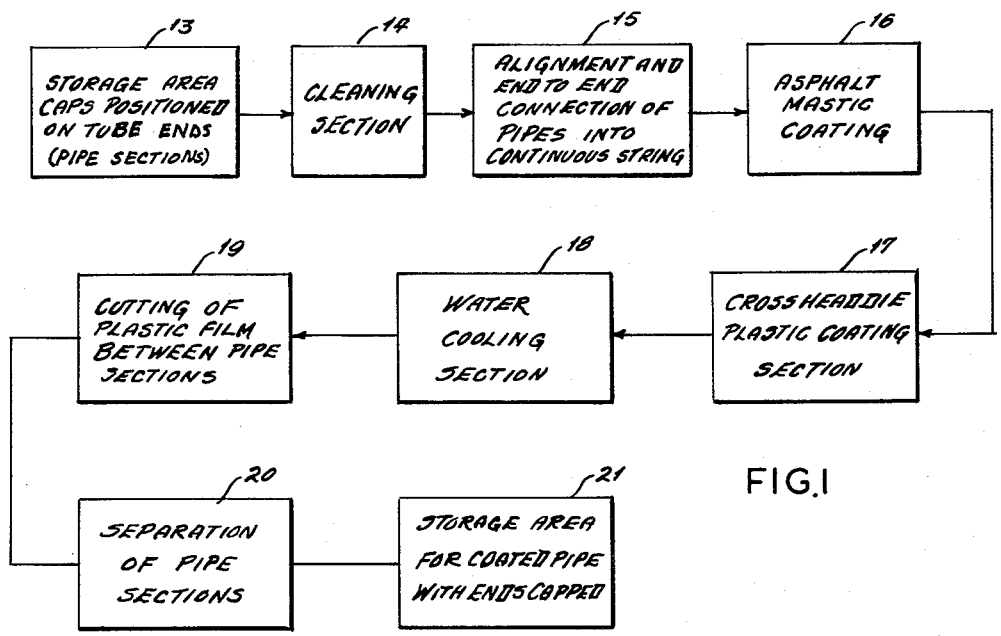

June 8, 1965        J. C. ASHLOCK        3,187,777

PIPE SECTION END COVER CONNECTING DEVICE AND METHOD

Filed May 7, 1962        3 Sheets-Sheet 1

INVENTOR:
JOE C. ASHLOCK
BY
Gravely, Lieder & Woodruff
ATTORNEYS.

June 8, 1965  J. C. ASHLOCK  3,187,777
PIPE SECTION END COVER CONNECTING DEVICE AND METHOD
Filed May 7, 1962  3 Sheets-Sheet 2

INVENTOR:
JOE C. ASHLOCK
BY
Gravely, Lieder & Woodruff
ATTORNEYS.

June 8, 1965  J. C. ASHLOCK  3,187,777
PIPE SECTION END COVER CONNECTING DEVICE AND METHOD
Filed May 7, 1962  3 Sheets-Sheet 3
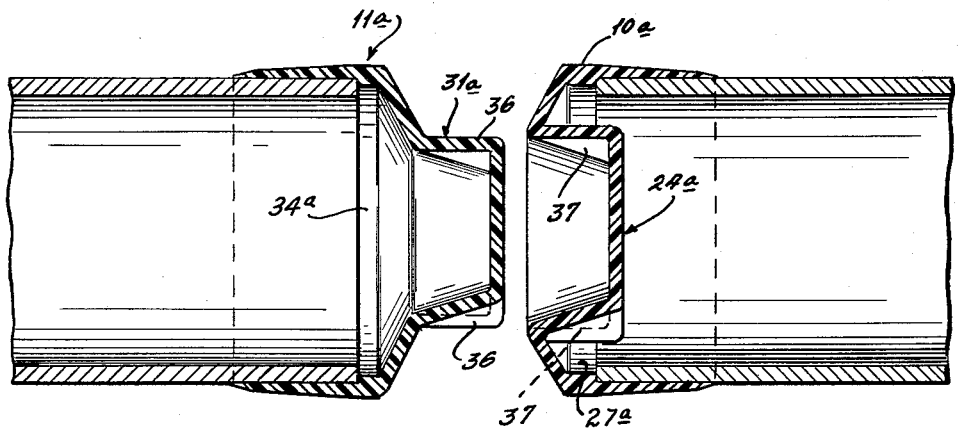
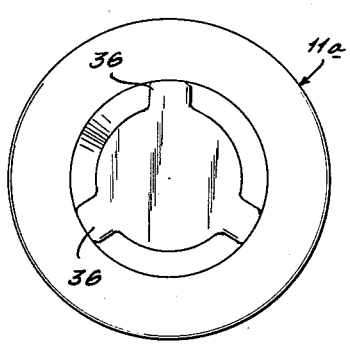 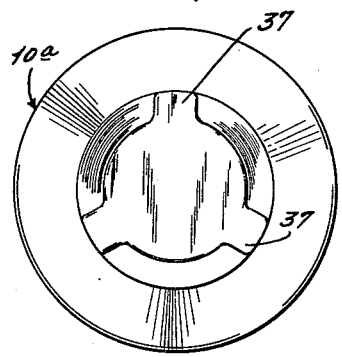
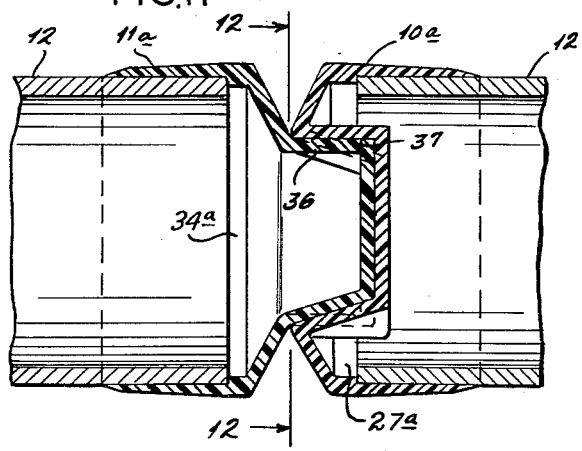 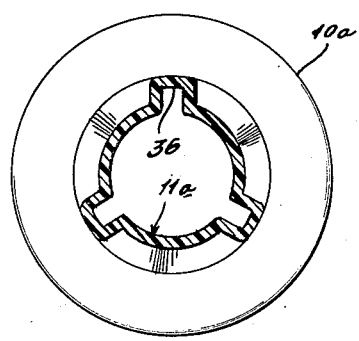
INVENTOR:
JOE C. ASHLOCK
BY Gravely, Lieder & Woodruff
ATTORNEYS.

United States Patent Office 3,187,777
Patented June 8, 1965

3,187,777
PIPE SECTION END COVER CONNECTING
DEVICE AND METHOD
Joe C. Ashlock, Kirkwood, Mo., assignor to Standard Pipeprotection Inc., St. Louis County, Mo., a corporation of Delaware
Filed May 7, 1962, Ser. No. 192,899
8 Claims. (Cl. 138—96)

The present invention relates to a device for protecting the ends of sections of pipe and also provides means for locking the pipe sections together during the coating thereof with a protective material. More particularly, the present invention relates to a device including a pair of cooperating male and female members which are positioned over the ends of pipe sections to enclose the open ends of the pipe and to provide means for connecting the sections of pipe into a continuous string during the coating thereof.

When steel pipe sections are buried in the ground, they must be coated with a thick coating of asphalt or an outer covering of a tough dielectric plastic material to prevent their breaking down from corrosion, oxidation, etc. in service.

The pipe in the processing plant normally is cleaned by sand blasting, shot treatment or the like before the outer coating is placed on the pipe. If the pipe is threaded, the threads must be protected from the shot treatment to avoid their being damaged and rendered unuseable. Also, if the pipe sections have plain ends and are to be butt welded in the field, the outer ends thereof are bevelled and it is conventional also to protect this bevelled surface during the cleaning operation.

Furthermore, the ends of the pipe sections must be closed during the cleaning operation or the cleaning material tends to collect inside the pipe and must be removed before the pipe is covered.

During the coating operation, it is customary to connect the pipe sections end to end by the means of double ended spools which fit inside the pipe sections. The positioning of these spools and their engagement with the pipe sections often is difficult, since the connection must be made while the pipe are moving, sometimes at a speed of 100 feet per minute.

After the pipe sections are coated, it is also conventional to apply an end cover to the ends of the pipe sections to prevent their being damaged in the field or collecting moisture and corroding inside the pipe.

Pipe line sections, which may vary in diameter from half an inch upwards to six or seven inches or even more, have the same outside diameter (O.D.) for both thick and thin walled pipe. However, the inside diameter (I.D.) of the two types of pipe varies, and thus an internal plug connector which snugly fits inside a thick wall pipe having a given O.D., would not provide a suitable snugly fitting connector when inserted into thin wall pipe having the same O.D.

Another variable in pipe sections concerns the configuration of the outside wall at the ends of the pipe sections. Straight walled pipe sections have a slight bevel on the end and are butt welded together in the field. However, threaded pipe sections normally are tapered at the end (T.E.) and thus the threaded and straight wall pipe sections have different outside diameters at their ends.

It is therefore one of the principal objects of the present invention to provide end caps for pipe sections, said caps being applied to the pipe sections before cleaning and coating of said sections and remaining on said pipe sections until the pipe is used in the field. The aforesaid end caps provide connecting means for connecting the pipe sections end-to-end in a continuous string during coating thereof; and said end sections also may provide drive means for rotating the continuous string of pipe sections during coating.

Another object of the present invention is to provide a pipe end protecting and connecting device having the hereinbefore mentioned advantages which further is adapted to be used on both threaded and straight end pipe sections.

Still another object of the present invention is to provide a throwaway polymeric synthetic resin plastic pipe protecting and connecting means which is applied to both threaded tapered end pipe and straight end pipe sections prior to cleaning of the pipe sections, and which serve to connect the pipe sections in a continuous string during the coating of the pipe with mastic or plastic.

A further object is to provide a throwaway cap means which is used to connect pipe sections during the in plant processing of said pipe sections, and which is retained on the ends of the pipe during storage and in the field to protect the pipe ends against damage and to prevent moisture from entering the pipe sections through the open ends.

Still another object is to provide a plastic pipe section end cover adapted to snugly grip the outer surface of straight end pipe and to be threaded onto the leading end of tapered threaded pipes.

These and other objects and advantages will become apparent hereinafter.

The present invention comprises throwaway end covers for pipe sections adapted to fit and enclose the ends of both threaded tapered end and straight end pipe sections, said end covers having cooperating engagement means providing a connection for the pipe sections during coating thereof. The invention further comprises a pipe section end cap which is positioned on the pipe sections prior to cleaning and which is not removed therefrom until the pipe sections are used in the field. This invention further comprises the method of coating pipe sections and the coated pipe sections hereinafter described and claimed.

Figures 2, 3:
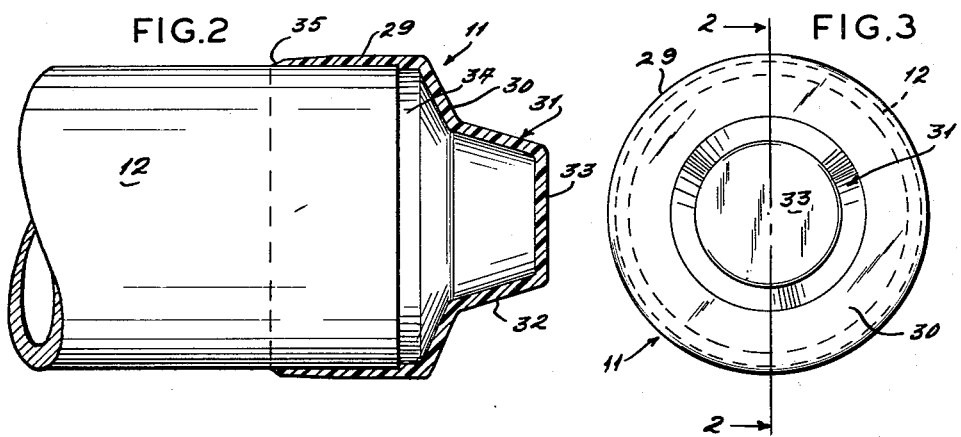
Figure 4:
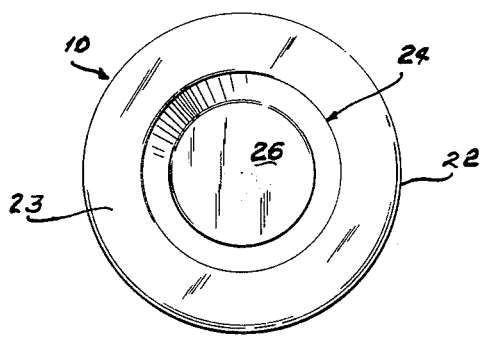
Figure 5:
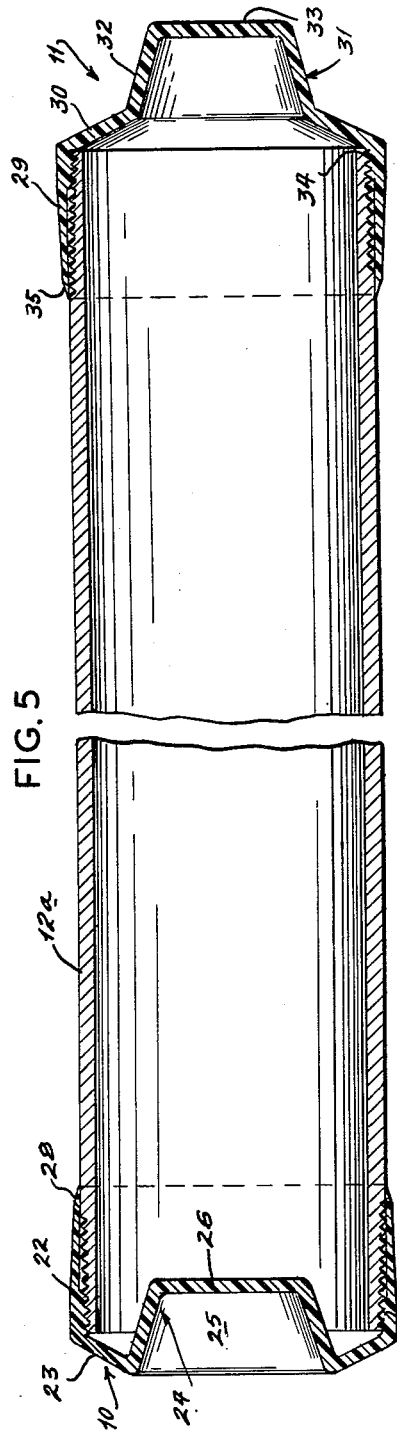
Figure 6:
Figure 7:
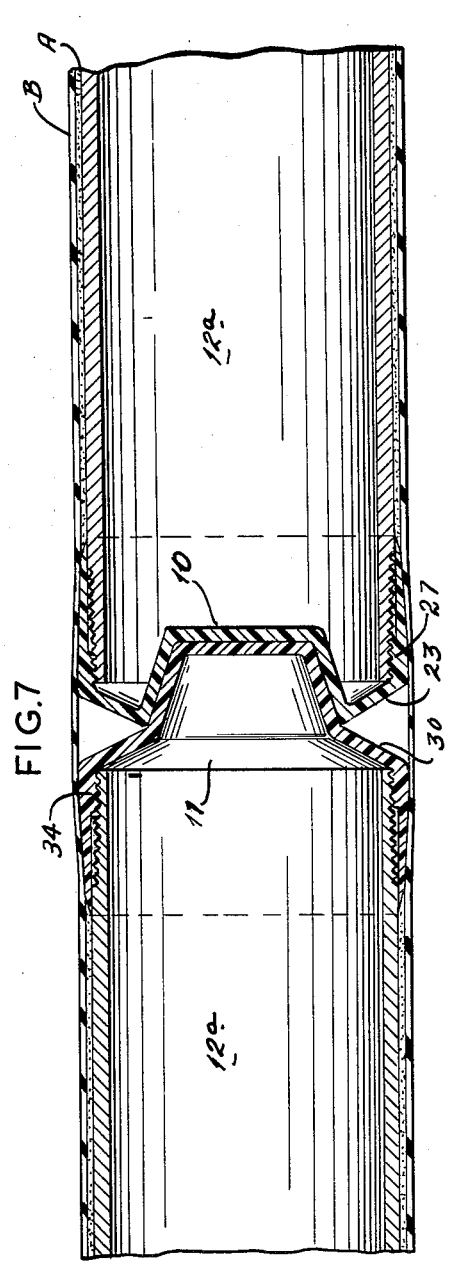

In the accompanying drawings wherein like numbers refer to like parts wherever they occur:

FIG. 1 is a flow diagram of a plastic coating process;
FIG. 2 is a vertical sectional view taken along line 2—2 of FIG. 3 showing the cap member applied to a straight end pipe;
FIG. 3 is an end view of the male cap member;
FIG. 4 is an end view of the female cap member;
FIG. 5 is a foreshortened vertical sectional view of the cap members applied to the opposite ends of a tapered threaded end pipe with the threaded pipe ends cut into the ribs on the inside shoulders of the cap members;
FIG. 6 is a broken elevational view of a string of pipe sections engaged by the cap members;
FIG. 7 is a broken vertical sectional view of two threaded tapered end pipe sections connected end-to-end by a male and a female cap member showing the pipe coated with mastic and plastic;
FIG. 8 is a broken vertical sectional view of a modification of the invention wherein the cap members are provided with interengaging drive means;
FIG. 9 is an end view of the male member shown in FIG. 8;
FIG. 10 is an end view of the female member shown in FIG. 8;
FIG. 11 is a partially broken vetical sectional view showing the male and female members of FIG. 8 in engaged driving position; and
FIG. 12 is a sectional view taken along line 12—12 of FIG. 11.

The present invention provides a pair of throw-away plastic cap members which are adapted to engage each other and which are adapted to fit over the outer surfaces of the opposite ends of a section of pipe. A portion of the inside wall of each of the caps defines a cylindrical surface. An enlarged rib is positioned at the base of the cylindrical opening, the rib being adapted to be threaded onto the end of a tapered threaded pipe section to securely engage the member thereto.

The outside trailing edges of the caps are bevelled so that a smooth surface with no abutting shoulder is provided to enable the pipe to easily pass through the rolls which apply the mastic to the pipe.

The male cap member has a truncated conical nose on the end which is adapted to engage a similarly shaped internal cup positioned on the female member. A pair of tapered shoulders define a V-shaped cut at the point of engagement of the two members which is used to spread the engaging members apart and thus separate the pipe sections after the coating operation is completed.

Referring to the drawings in detail, FIG. 1 shows a flow diagram of typical processing operation for coating pipe with a polyethylene plastic coating. The caps 10 and 11 are positioned on the ends of pipe sections 12 as the pipe sections 12 are stored on a storage rack in a storage area 13. The pipe sections 12 are carried to a cleaning station 14, where they are cleaned by shot blasting or the like. The caps 10 and 11 enclose the ends of the pipe sections 12 and keep the shot out of the pipe sections 12. The pipe sections then roll to an aligning station 15 where a variable speed conveyor moves the sections 12 forwardly and aligns said sections 12. The pipe sections 12 are connected end-to-end by the engagement of the male end cap 11 in the female cap 10 (FIG. 7). The pipe sections 12 are positioned on the conveyor with the male cap 11 forwardly and as the next pipe section 12 is positioned on the conveyor, the trailing pipe section 12 is speeded up and engages the female cap 10 on the trailing end of the first pipe section 12.

The connected pipe string is passed through pressure applicators 16 which apply a thin coating of asphalt mastic to the pipe 12. The mastic is indicated by the letter "A" in FIG. 7 and is not shown on the other figures for purposes of clarity. The diameter of the caps 10 and 11 is such that the outer surface of the caps is wiped relatively free of mastic by rollers in the applicators 16. The caps 10 and 11 protect the threads (if the pipe 12 is threaded) and the interior of the pipe 12 from the mastic in the mastic coating step.

From the mastic coating station 16, the connected pipe string passes through a cross head die 17 where a film of plastic is formed in a tube like shape and is extruded over the outer surface of the mastic coated pipe 12. The plastic coating is shown only in FIG. 7 and is there indicated by the letter "B." The tolerances of the cross head die 17 are close, and require that the pipe sections 12 be connected and in a continuous string for proper operation thereof. Also, the pipe sections 12 need to be aligned and connected to prevent the plastic film B from breaking as it is pulled over the pipe.

From the cross head die 17, the plastic coated pipe sections 12 pass to a cooling station 18 where water is sprayed on the plastic coated pipe sections 12 to cool the plastic B and shrink it tightly around the pipe 12.

The plastic coated pipe 12 then passes to a cutting machine station 19 where a cut is made in the plastic B stretched over the "V" defined between the cap members 10 and 11 to separate the pipe sections 12. The pipe sections 12 then are separated in a separation station 20 by speeding up the out-bound or leading pipe 12. After the sections are separated, the leading pipe section 12 is kicked-off the conveyor to a storage rack in a storage area 21.

The caps 10 and 11 remain on the ends of the pipe sections 12 during storage in the plant, shipping, and at the site until the pipe sections 12 are laid in the ground. The caps 10 and 11 protect the inside of pipe sections 12 from corrosion and protect the ends and the threads from damage.

Since the caps 10 and 11 are installed onto the ends of the pipe sections 12 early in the plant processing and are not removed until the pipe are laid, much time, expense, and labor is saved. The caps 10 and 11 also serve the dual purpose of being connecting means during the plant processing and of protecting the pipe and the pipe ends both in the plant and in the field.

FIGS. 2–5 and 7 show the details of construction of the pipe caps 10 and 11. The female cap 10 consists of a cylindrical portion 22, an inwardly tapered shoulder 23 or frusto-conical portion, and an inturned cup section 24 having tapered side walls 25 and a base 26 inside of the cap 10. At the junction of the cylindrical portion 22 and the tapered surface 23 is an enlarged internal rib 27 which is adapted to engage the tapered end of a threaded pipe section 12a by threading the pipe therein. The surfaces 23, 25 and 26 defined the closed end of the cap 10 and the open end thereof is defined by the free end of the cylindrical portion 22. A tapered surface 28 connects the outer surface of the cylindrical member 22 with the open end thereof.

The male cap member 11 includes a cylindrical portion 29, a tapering shoulder 30 or truncated conical portion, and a projection 31, including a tapered side wall 32 or truncated conical portion, and a leading edge or base 33. Within the cap 11 at the internal junction of the cylindrical surface 29 and the tapered shoulder 30 is an enlarged rib 34, which is adapted to be threaded onto the end of a tapered threaded pipe section 12a (FIG. 5). The trailing edge 35 of the cap 11 is tapered to lessen drag when the cap 11 is passed through the coating process.

When the male and female members 10 and 11 are engaged, the projection 31 fits into the cup 24 and the tapered shoulders 30 and 23 respectively, define a V-shaped notch therebetween (FIGS. 6 and 7). When the plastic coated connected pipe sections are separated, a cut is made in the plastic film B within the "V" defined by the shoulders 23 and 30 and the members 10 and 11 can be separated by speeding up the leading pipe section, or by inserting a tool between the shoulders 23 and 30, if necessary. The frusto-conical nose 31 and the cooperating frusto-conical cup 24 allow the pipe sections 12 to separate readily and insure that no seizure takes place during alignment and engagement thereof.

When the caps 10 and 11 are utilized with straight end pipe sections 12 (FIGS. 2–4), the straight interior walls of the cap cylindrical portions grip the outer surface of the pipe sections 12. FIG. 2 shows a male cap 11 slipped over the end of a straight wall pipe section 12 with the cylindrical portion 29 frictionally engaged with the outer surface of the pipe section 12. The bevelled end of the pipe 12 engages the annular internal shoulder 34, and the shoulder 34 provides additional strength for the cap 11, if the end of the pipe section 12 is impacted violently. The rib 34 also provides additional protection for the surface which is to be welded. The female cap member 10 is positioned similarly on the opposite end of the pipe section 12.

As hereinbefore indicated, when the caps 10 and 11 are positioned on the ends of tapered threaded pipe sections 12a, the ends of the pipe sections are threaded into the cap ribs 27 and 34 as shown in FIG. 5. Thus, it is apparent that for a given outside diameter pipe dimension, the same cap (either female 10 or male 11) can be used on both threaded and straight wall pipe, and also can be used on both thick wall and thin wall pipe; as both thick and thin wall pipe of a given size have the same outside dimensions though the inside diameters vary. Thus one die will do the work that four dies normally might be expected to do. This is a considerable saving in initial cost and also in fabrication techniques.

A modification of the present invention is shown in FIGS. 8–12 wherein the male end cap 11a is provided with lugs 36 on the projecting member 31a which are adapted to engage cooperating grooves 37 on the cup shaped portion 24a of the female member 10a. When the male member 11a is engaged with the female cap member 10a on an adjacent pipe section 12 (FIG. 11), the lugs 36 are engaged in the notches 37. Thus, when either of the pipe sections 12 is rotated, the other will be correspondingly driven with a rotating motion. The advantage of the instant modification is that when coating pipe sections with an asphaltic covering, the final step in the coating process involves wrapping of the asphalt covered pipe with paper. The paper web normally is held firmly, and the pipe sections are rotated to wrap the paper around the asphalt covered pipe.

The end caps preferably are made of a thermoplastic material such as polypropylene, but other polymeric synthetic resin type plastics such as polyethylene, nylon, etc. are satisfactory.

This invention is intended to cover all changes and modifications of the examples of the invention herein chosen for purposes of the disclosure, which do not constitute departures from the spirit and scope of the invention.

What is claimed is:

1. An end cover for pipe sections comprising a hollow internal cylindrical portion having a smooth inner surface, a closure portion joined to said cylindrical portion and closing one end thereof, and an annular internal rib at the one end of the cylindrical portion at the junction of said cylindrical portion and said closure portion.

2. The end cover defined in claim 1 wherein said closure portion includes an intermediate member of frusto-conical shape and an end member.

3. The end cover defined in claim 2 wherein said end member is of frusto-conical shape.

4. The end cover defined in claim 3 wherein said end member extends outwardly from said cylindrical portion.

5. The end cover defined in claim 3 wherein said end member extends backwardly into said cylindrical portion.

6. The end cover defined in claim 3 wherein said end member is provided with integral means for engaging a cooperating mating end cover in non-rotative relation with respect thereto, so that rotation of one of the engaged end covers causes corresponding rotation of the other end cover.

7. A combination pipe section alignment and pipe end protecting cap assembly adapted for use on both plain end and threaded pipe comprising a first cap member having a cylindrical internal portion adapted to fit over one end of a pipe section, a closure portion joined to said cylindrical portion, and an annular internal rib at the connection between said cylindrical portion and said closure portion, said closure portion having a connecting member extending outwardly from said cylindrical portion, and a second cap member having a cylindrical internal portion adapted to fit over the other end of said pipe section, a closure portion joined to said cylindrical portion, and an annular internal rib at the connection between said cylindrical portion and said closure portion, said closure portion having a receptacle adapted to receive the connecting member of a first cap member, said annular ribs being adapted to engage the threads of a threaded pipe section.

8. The assembly defined in claim 7 wherein said first end cap closure portion connecting member and said second end cap closure portion receptacle are provided with cooperating drive lugs and channels whereby rotary motion can be impacted to a string of said pipe sections connected end-to-end through said cap members.

References Cited by the Examiner
UNITED STATES PATENTS

| | | | |
|---|---|---|---|
| Re. 21,394 | 3/40 | Lytle | 138—96 |
| 2,727,651 | 12/55 | Mickelson | 138—96 |
| 2,737,205 | 3/56 | Stringfield | 138—96 |
| 2,826,222 | 3/58 | Case | 138—96 |
| 2,873,765 | 2/59 | Gregory | 138—96 |
| 2,881,093 | 4/59 | Buell | 117—94 |
| 2,942,625 | 6/60 | Costanzo | 138—96 |
| 2,956,311 | 10/60 | Raydt et al. | 18—59 |
| 2,977,993 | 4/61 | Scherer | 138—96 |
| 2,989,087 | 6/61 | Higgins | 138—96 |
| 3,015,133 | 1/62 | Nichols | 18—59 |
| 3,036,931 | 5/62 | Kell | 117—94 |
| 3,065,767 | 11/62 | Topf | 138—96 |

EDWARD V. BENHAM, *Primary Examiner.*

MORRIS LIEBMAN, *Examiner.*